US010609057B2

(12) United States Patent
Igbe et al.

(10) Patent No.: US 10,609,057 B2
(45) Date of Patent: Mar. 31, 2020

(54) DIGITAL IMMUNE SYSTEM FOR INTRUSION DETECTION ON DATA PROCESSING SYSTEMS AND NETWORKS

(71) Applicant: Research Foundation of the City University of New York, New York, NY (US)

(72) Inventors: Obinna Igbe, Bronx, NY (US); Tarek Saadawi, Franklin Lakes, NJ (US); Ihab Darwish, East Brunswick, NJ (US)

(73) Assignee: Research Foundation of the City University of New York, New York, NY (US)

( * ) Notice: Subject to any disclaimer, the term of this patent is extended or adjusted under 35 U.S.C. 154(b) by 190 days.

(21) Appl. No.: 15/633,056

(22) Filed: Jun. 26, 2017

(65) Prior Publication Data

US 2017/0374091 A1  Dec. 28, 2017

Related U.S. Application Data

(60) Provisional application No. 62/355,058, filed on Jun. 27, 2016, provisional application No. 62/453,217, filed on Feb. 1, 2017.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1441* (2013.01)

(58) Field of Classification Search
CPC .. H04L 63/1425; H04L 63/1441; G06N 20/00
See application file for complete search history.

(56) References Cited

U.S. PATENT DOCUMENTS 8,621,631 B2    12/2013  Koelle et al.
9,473,525 B2 *  10/2016  Handel ................ H04L 63/145
(Continued)

OTHER PUBLICATIONS

Hofmeyr, S. et al.; Architecture for an Artificial Immune System; Evolutionary Computation; 1999 ; pp. 45-68; vol. 7 (1); Massachusetts Institute of Technology.
(Continued)

*Primary Examiner* — Techane Gergiso
(74) *Attorney, Agent, or Firm* — Peter J. Mikesell; Schmeiser, Olsen & Watts, LLP (57) ABSTRACT

A method for detecting intrusion is provided using a combination of two AIS algorithms: Negative Selection Algorithm (NSA) and Dendritic Cell Algorithm (DCA). The method includes the following steps, or some functional subset of these steps: periodic monitoring of a data processing system for anomalous behavior that may indicate the presence of an intruder or an undesirable software; using the NSA for the generation of a population of detectors that are used for detecting anomalies in the monitored system via a matching criterion; using the DCA (which runs in parallel to the NSA) to sample traffic and signals coming in or out of the data processing system; using an aggregation system to combine the individual decisions of the NSA and the DCA to form a single final decision.

20 Claims, 10 Drawing Sheets

(56) References Cited

U.S. PATENT DOCUMENTS

| | | | | |
|---|---|---|---|---|
| 2003/0129659 A1* | 7/2003 | Whelihan | ............... | G06Q 50/22 435/7.1 |
| 2013/0305371 A1 | 11/2013 | Figlin et al. | | |
| 2016/0021120 A1* | 1/2016 | Handel | ................ | H04L 63/145 726/23 |
| 2016/0094580 A1* | 3/2016 | Handel | ................ | H04L 63/145 726/23 |
| 2016/0127387 A1* | 5/2016 | Handel | ................ | H04L 63/145 726/23 |

OTHER PUBLICATIONS

Greensmith, J. et al.; Articulation and Clarification of the Dendritic Cell Algorithm; 2006; pp. 404-417; ICARIS 2006. Lecture Notes in Computer Science, vol. 4163; Springer, Berlin, Heidelberg.

Igbe, O. et al.; Distributed Network Intrusion Detection System: An Artificial Immune System Approach; 2016 IEEE First International Conference on Connected Health: Applications, Systems and Engineering Technologies (CHASE); Jun. 27-29, 2016; pp. 101-106.

* cited by examiner

DIGITAL IMMUNE SYSTEM FOR INTRUSION DETECTION ON DATA PROCESSING SYSTEMS AND NETWORKS

CROSS-REFERENCE TO RELATED APPLICATIONS

This application claims priority to and is a non-provisional of U.S. Patent Application 62/355,058 (filed Jun. 27, 2016) and 62/453,217 (filed Feb. 1, 2017), the entirety of which are incorporated herein by reference.

BACKGROUND OF THE INVENTION

Security of computer systems and its interconnecting networks have become a major issue in recent years due to the menace caused by hackers (a person or group of persons that uses computers to gain unauthorized access to data).

For a successful attack or intrusion, hackers may employ the use of Malware (Viruses, Trojans or Worms). They may also exploit vulnerabilities that exist in currently used data processing or communication systems and the protocols that govern their data exchange.

As employed herein, "intrusion" is the act of gaining unauthorized access to a system or a network of systems. This unauthorized act may originate from within the system or network. It can also originate from systems or networks that are external to the current system being protected.

Though a secured network built around user authentication, data encryption, and firewall systems have been able to protect companies and individuals from external and in some degree internal attacks, computer hackers continuously find ways to subvert these systems to attack networks and its interconnected computers. A protection system like the firewall is vulnerable to errors in configuration and ambiguous or undefined security policies leaving behind some exploitable weaknesses. Intrusion detection system (IDS), therefore, becomes a necessity as an additional wall for protecting systems despite the prevention techniques.

Currently, several commercial IDSs are successful in detecting intrusions that have signatures that are known a priori. These kinds of IDS are known as signature based IDS. However, conventional IDSs (like the signature-based IDS) are typically unable to detect the occurrence of a cyber-attack or intrusion for which they have not been programmed to detect explicitly (i.e., for which they have no signatures for).

Emerging ways to solve intrusion detection problem (and the problems associated with the use of signature-based IDSs) involves using algorithms that exist in a branch of Artificial Intelligence called Artificial Immune System (AIS).

AIS is a developing area of artificial intelligence. Originally AIS set out to find efficient abstractions of processes found in the human immune system (HIS) but, more recently, it is becoming interested in modeling the biological processes and in applying immune algorithms to bioinformatics problems. The Self-nonself (SNS) and the Danger Theory (DT) model are two immunology models that have successfully been utilized in AIS in the design of IDS systems to detect network attacks.

The Self-nonself (SNS) model focuses on the adaptive nature of the immune system, i.e., it uses the adaptive immune system and its memory or self-learning capability. In this model, the B cells (which are called detectors in AIS) would have antigen specific receptors that can recognize non-self or foreign bodies and in turn initiate an immune system response that is specific to the system where this AIS model is applied. In this technique, the first step involves randomly generating detectors (which is the AIS's equivalent of B cell in HIS). These detectors that are still immature are then exposed to a set of self-structures. Any detector that reacts or matches any member of the self set is eliminated. The remaining members of the detector set that were unreactive with any member of the self set become mature detectors. This detector selection technique is called negative selection and the algorithm used to perform this computation is called a Negative Selection Algorithm (NSA) which is described in some references, including S. A. Hofmeyr and S. Forrest, "Architecture for an artificial immune system," Evolutionary Computation, vol. 8, no. 4, pp. 443-473, 2000.

Unlike the detection of non-self antigens or pathogenic molecules, the danger theory (DT) model proposes that the immune system detects the presence of danger signals, released as a result of necrotic cell death within the host tissue. Necrosis is the result of cellular damage and stress caused by pathogenic infection or exposure to extreme conditions. The DT proposes that the immune system is sensitive to changes in the danger signal concentration in the tissue. This model has been abstracted into multiple mathematical algorithms one of which is called the Dendritic Cell Algorithm (DCA). The DCA (described in some references, including Greensmith, Aickelin, and Twycross, "Articulation and Clarification of the Dendritic Cell Algorithm." In Proc. of the 5th International Conference on Artificial Immune Systems, LNCS 4163, 2006, pp. 404-417) is a population-based system, with each agent in the system, represented as a cell called the Dendritic Cells (DC). Each cell can collect data items, termed antigen, and the processing of values of the input signal. The combination of the input signals forms cumulative output signals of the DCs. The population of cells is used to correlate co-occurring and disparate data sources, effectively combining the 'suspect' data (antigen) with 'evidence' in the form of signals. Each DC has the capability to combine the relative proportions of input signals to produce its set of output signals. Input signals to the DCA are pre-categorized into three main signals called the pathogenic associated molecular patterns (PAMP) signal, Danger signal, and the Safe signal. These signals have been ordered based on the level of malicious activity they represent. PAMP signal indicates that there exists to a high degree of certainty, malicious activity, while Danger signal indicates that there exists an anomalous activity, but with little certainty, and Safe signal means that there is no occurrence of any anomalous activity.

Present applications of the NSA and the DCA typically consider how either DCA or NSA can be used to protect computing systems. There has been little development on combining both NSA and DCA together to combat the security issues in a data processing system or network.

BRIEF DESCRIPTION OF THE INVENTION

The present disclosure is directed to a method and system for detecting intrusions in a data processing system or network, by combining two Artificial Immune System algorithms.

In one example, a system comprises a local node, one or more connected nodes linked to the local node, and a detection module in the local node. The detection module in the local node analyzes user activities, or network traffic going in or out of the local node. The decision module may further classify these activities or traffic as malicious or benign.

The local node and connected node(s) may comprise: (a) a collection of discrete computing devices, (b) a collection of logical nodes within a single computing device, or (c) a combination of discrete computing devices and logical nodes. The network may comprise a distributed network or a centralized network having a central server and a plurality of computing nodes attached to the central server. The central server may comprise a cloud server (i.e., a logical server that is built, hosted and delivered through a cloud computing platform over the Internet). The detection module may comprise a plurality of sensors for gathering data. This gathered data may comprise (but not limited to): network traffic features; user behavioral data; data from user computer activities; and user location data. The detection module may also comprise of: a data fusion module; a data pre-processor; the Dendritic Cell Algorithm (DCA) module; the Negative Selection Algorithm (NSA) module; and a decision module. The data fusion may involve fusing all the raw sensor data from the different sensors into one big chunk of data having multiple features, and passing this combined data chunk to the data pre-processor. The data pre-processor may scale the input data obtained from the data fusion block to fall within the range of 0 and 1. The data pre-processor may derive the pathogenic associated molecular patterns (PAMP) signal, Danger signal, and the Safe signal using the sum, mean or median of the different features in the scaled data chunk. In the detection module, the NSA module and the DCA module may run in parallel. The NSA module may comprise a plurality of individual Negative Selection Algorithms running in parallel with each other. The DCA module may comprise a plurality of individual Dendritic Cell Algorithms running in parallel. The decision module may combine the results from the individual Negative Selection and Dendritic Cell Algorithms running therein to generate a final value which is used in classifying an activity/traffic as malicious or benign.

In another example, a method is disclosed for operating a network comprising a plurality of computing nodes, one of which is a centralized server. The method comprises running the detection module on the server, and all the computing nodes in the network. The server may have a processing capability much larger than that of a regular computing node which constitutes the network. The detector module running on the computing nodes analyzes data extracted from incoming and outgoing activity/traffic. This extracted data are obtained from sensors linked to the computing node. The detector in the computing nodes may further run a DCA and NSA module which may both comprise a plurality of individual NSA and DCA algorithms respectively. One computing node may request for assistance from only the server if the computing node is unable to classify an activity/behavior as malicious or benign with a confidence value greater than a preset value. The server may save both the request and result of the query (sent by the computing node) for future requests it may receive (from any other computing node in the network) which may match the query from the computing node. The method may further involve comparing the confidence value of the results received from the server to the confidence value of the result obtained by the computing node. The computing node may select the result that has a higher confidence value.

In another example, a method is disclosed for operating a distributed network comprising a plurality of computing nodes. The method comprises running the detection module on each of the computing nodes. One computing node may request for assistance from a neighboring node if the computing node is unable to classify an activity/behavior as malicious or benign with a confidence value greater than a preset value. The assisting node may save both the request and result of the query (sent by the computing node) for future requests it may receive (from any other computing node in the distributed network) which may match the query from the computing node. The method may further involve comparing the confidence value of the results received from the assisting neighboring node to the confidence value of the result obtained by the computing node. The computing node may select the result that has a higher confidence value.

In another example, a method is disclosed for operating a centralized network comprising a plurality of computing nodes, one of which is a centralized server. The method comprises running the detection module only on the centralized server. The centralized server may be placed in the network such that all incoming and outgoing traffic flows through it. The detection module running on the centralized server analyzes data extracted from incoming and outgoing network activity/traffic. This extracted data are obtained from sensors which may be positioned at various points of the network or the same location as the centralized server. The detector in the centralized server may further run a DCA and NSA module which may both comprise a plurality of individual NSA and DCA algorithms respectively. The centralized server may have a processing capability much larger than that of a regular computing node which constitutes the centralized network.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

Non-limiting and non-exhaustive embodiments of the invention are described with reference to the following drawing. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

In the following detailed description of exemplary embodiments of the invention, reference is made to the accompanying drawings, which form a part hereof, and which show, by way of illustration, specific exemplary embodiments by which the invention may be practiced. Each embodiment is described in sufficient detail to enable those skilled in the art to practice the invention, and it is to be understood that other embodiments may be utilized, and other changes may be made, without departing from the spirit or scope of the invention. The following detailed description is, therefore, not to be taken in a limited sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present application discloses an implementation of an IDS for detecting internal and external cyber-attacks and unauthorized computing activities. This implementation may make use of two AIS algorithms, namely: the negative selection algorithm (NSA), and the dendritic cell algorithm (DCA).

Figure 1:
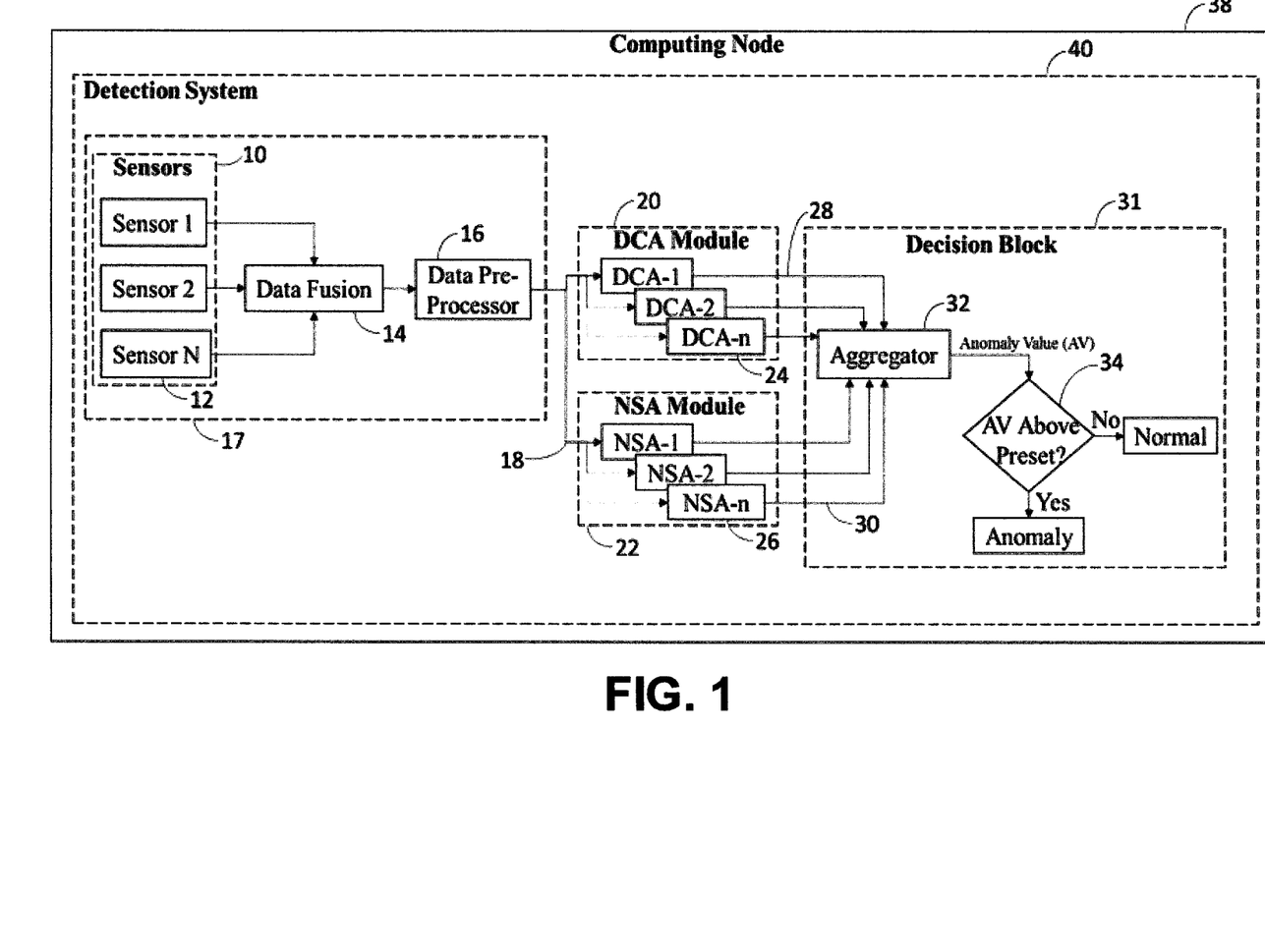
FIG. 1 is a block diagram illustrating one example of a computing node comprising a detection module.

FIG. 1 is a block diagram illustrating one example of a computing node 38 comprising a detection module 40. The computing node 38 may comprise: (a) a collection of discrete computing devices (e.g., notebook computer, desktop computer, embedded computer), (b) a collection of logical nodes within a single computing device (e.g., a virtual machine), or (c) a combination of discrete computing devices and logical nodes. The computing node 38 may include virtually any device capable of connecting to another device and receiving information. Such devices may also include portable devices such as cellular telephones, smartphones, wearable computers, programmable consumer electronics, and the like.

Computing node 38 may include at least one client application that is configured to receive content from another computing node 38. Computing node 38 may also include virtually any process including client applications, operating system, components of an operating system, or the like, useable to perform a variety of other actions.

In the illustrated example, each detection module 40 that runs within a computing node 38 may comprise a plurality of sensors 10 which measure raw sensor data. An individual sensor N 12 may measure data such as network traffic parameters (e.g., packet header contents or payload contents), location information (e.g., longitude and latitude position information, or room number in the case of a card reader sensor), time (e.g., using an employee badge reader to measure the time of arrival of an employee), process and memory utilization information, size and number of files downloaded, and number or type of external devices plugged into a computing node 38, etc. The detection module 40 may comprise the data fusion module 14 which combines data from different sensors 10 to form a chunk of data consisting of multiple columns, where each data column is from a specific sensor that makes up the sensors module 10. The data fusion module 14 may operate as a standalone process, or it may operate under the same process as the detection module 40.

The detection module 40 may comprise the data pre-processor module 16. In the data pre-processor module 16, all individual data value that make-up the fused data from the data fusion module 14 may be scaled to fall within the range of 0 and 1. In this data pre-processing module 16, features or columns from the fused data are used to form an input vector 18 consisting of antigen and three signals that will be utilized by the detection module 40. An antigen in this specification may represent an existing attribute of the system which can be used to identify a traffic/activity uniquely. An example of an antigen may include a file name, a transport control protocol (TCP) ID, the network or physical address of another node, an employee name or ID, etc. Each antigen is referenced using its antigen ID which is a unique integer or real number. The three signals in the input vector 18 include: PAMPs—the presence of Pathogenic associated molecular patterns (PAMP) signals usually indicates an anomalous situation; danger signals (DS)—the presence of danger signals may or may not indicate an anomalous situation (however, the probability of an anomaly is higher than under normal circumstances); and the safe signal (SS)—this signal increases in value in conjunction with observed normal behavior (hence, the presence of safe signals almost certainly indicates that no anomalies are present).

The DCA module 20 and the NSA module 22 may run in parallel. The NSA module 22 may comprise a plurality of individual Negative Selection Algorithms running in parallel with each other. The DCA module 20 may comprise a plurality of individual Dendritic Cell Algorithms running in parallel. An individual Dendritic Cell Algorithm DCA-n 24 and an individual Negative Selection Algorithm NSA-n 26 both use the input vector 18 to make individual predictions that are submitted to the aggregator module 32. These individual predictions from plurality of algorithms that constitute the DCA module 20 and the NSA module 22, may be a signal that takes a value of either +1 which means that the antigen in the input vector 18 is malicious/an attack, or −1 which means the antigen in input vector 18 is from a normal/benign antigen. The predictions can also be a signal with a value of 0 or 1, where 1 represents a malicious/an attack antigen, and a 0 represents a normal/benign antigen. In the decision block 32, the aggregator module 32 may combine the signals 28 from the DCA algorithm and the signals 30 from the individual NSA algorithms to form an anomaly value by either computing their average, weighted average or sum. In block 34, the aggregator module 32 determines if the anomaly value has exceeded a preset threshold. In block 34, the detector module 40 classifies the antigen in input vector 18 as an "anomaly" if the anomaly value is greater than a preset threshold, or "normal" if the anomaly value is below the preset threshold.

Figure 2A:
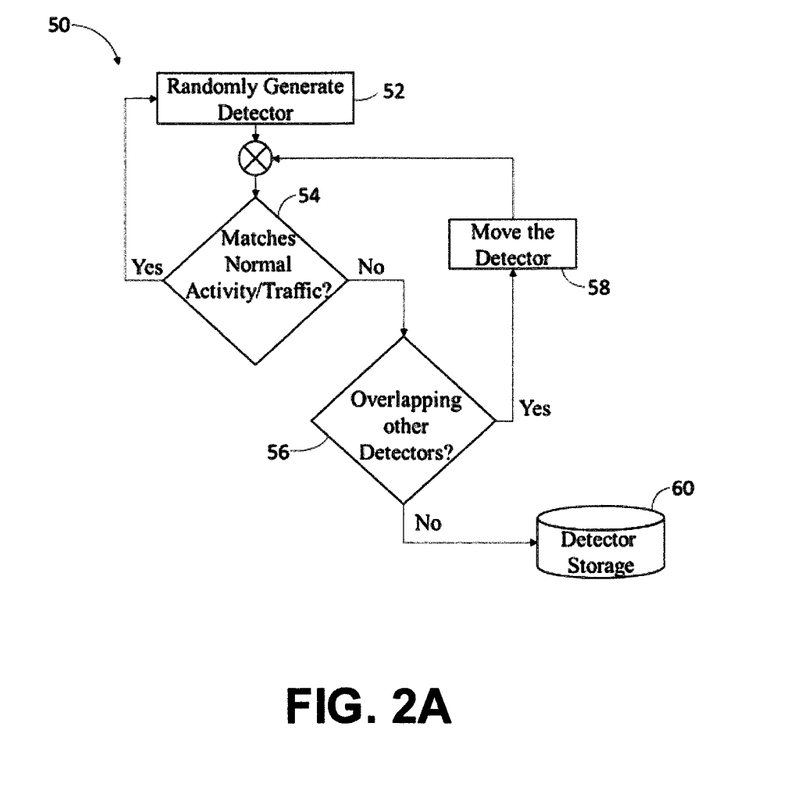
FIG. 2a is a flow chart illustrating one example of the detector generation technique used by individual NSAs that make up the NSA module.

FIG. 2a is a flow chart illustrating one example of the detector generation technique used by individual NSAs (like NSA-n 26) that make up the NSA module 22. This detector generation stage of the individual NSA algorithms can also be called the training phase 50 of the NSA module 22. In this technique, first, antigens (and their associated signal in the input vector 18) which are indicative of a normal behavior of the network or data processing system being protected, are extracted from the network or data processing system (like the computing node 38) for a specific duration of time. Secondly, a random detector with the same dimension as the input vector 18 is generated by the random generation block 52. Block 54 compares this detector generated by the random generation block 52 with all the normal profiles (i.e., those input vectors 18 that are indicative of normal behavior). If block 54 matches this random detector with any normal profile, the detector is discarded, and another new random generation is generated by the random generation block 52. The matching rule may specify a 100 percent matching or a percentage close to this which is decided before the training phase 50 is started. If block 54 fails to match this random detector with any normal profile, the detector moves to block 56 where it is compared with previously generated detectors (which are stored in the detector database 60) for any overlap. In block 56, the same matching technique employed in block 54 may be used. Any new random detector that matches or overlap any other previously generated detector is moved slightly by block 58. The detector which has been moved is again sent back to block 54, and the steps from block 54, 56 and 58 are repeated. In block 56, any detector that does not match or overlap any previously generated detector is stored in the detector database 60. The detector generation process continues until a desired number of detectors are obtained.

Figure 2B:
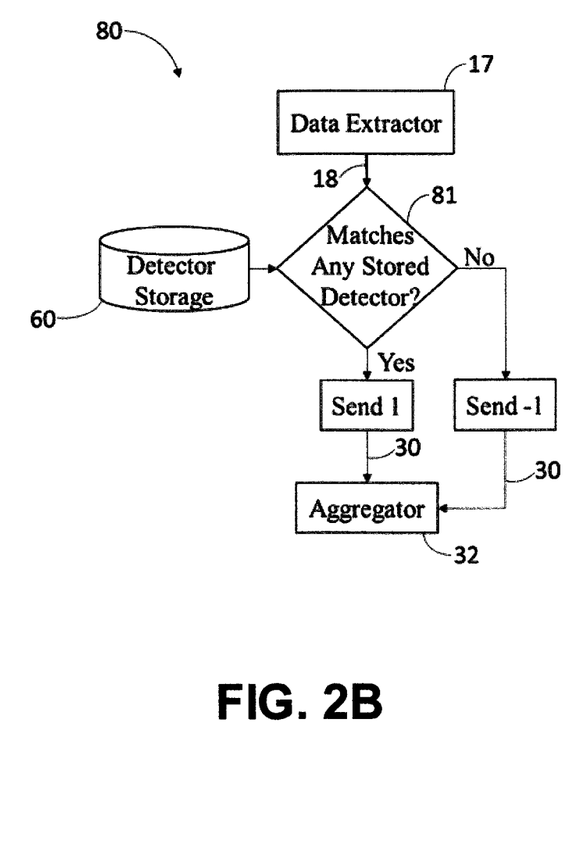
FIG. 2b is a flow chart illustrating one example of how the detectors generated in FIG. 2a may be used by individual NSAs that constitute the NSA module to analyze incoming data.

FIG. 2b is a flow chart illustrating one example of how the detectors generated in FIG. 2a may be used by individual NSAs that constitute the NSA module 22 to analyze any input vector 18 from the data extractor block 17. This stage of the individual NSA algorithms can also be called the testing phase 80 of the NSA module 22. In block 81 of the testing phase 80, any input vector 18 coming from the data extractor block 17 is compared with the detectors stored in the detector database 60. The same matching criteria used in block 54 of the training stage 50 is re-used in block 81 of the testing phase 80. If any input vector 18 matches any stored detector, a signal 30 with a value of +1 is sent to the aggregator block 32. If any input vector 18 does not match any stored detector, a signal 30 with a value of −1 or 0 is sent to the aggregator block 32.

Figure 3A:
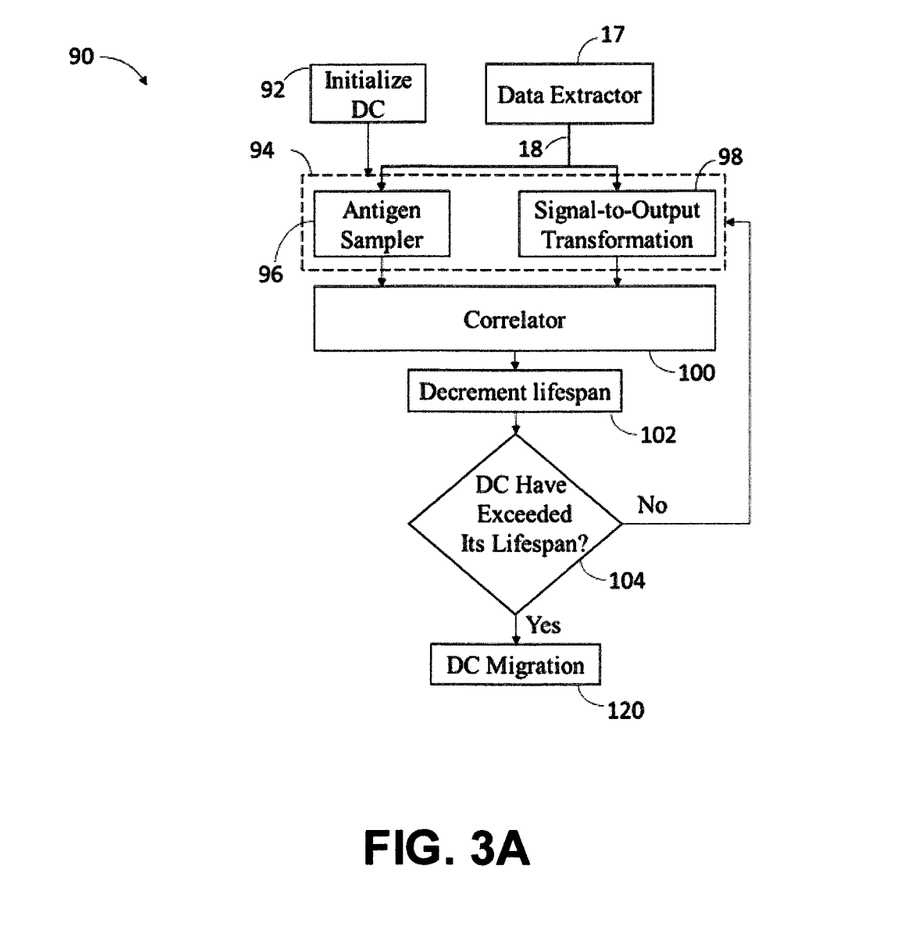
FIG. 3a is a flow chart illustrating a method of operating an individual Dendritic Cell (DC) within a dendritic cell algorithm (DCA) which constitutes a DCA module.

FIG. 3a is a flow chart illustrating a method of operating an individual Dendritic Cell (DC) within a dendritic cell algorithm DCA-n 24 which constitutes a DCA module 20. The first step in this chart involves creating a DC instance and initializing it in block 92. One of the parameters that may be initialized in block 92 is the lifespan of the DC which may be set to a random number or the desired number obtained from experimentation. The next step occurs in block 94 where the antigen sampler block 96 samples an antigen from the input vector 18 coming from the data extractor block 17. Also in block 94, a signal-to-output transformation block 98 samples the signals that are associated with the antigen sampled by the antigen sampler block 96. The signal-to-output transformation block 98 uses a weighted equation to transform each presented signal value into an output signal. The equation below shows an equation that may be used to compute two output signals:

$$O_1 = W_1 S_P + W_1 S_D + W_1 S_S$$

$$O_2 = W_2 S_P + W_2 S_D + W_2 S_S$$

In the above equation, the signals $S_P$, $S_D$, and $S_S$ represent the PAMP, Danger and a Safe signal respectively, and are associated with the antigen sampled by the antigen sampler 96. The weights $W_1$ and $W_2$ are pre-assigned and may be obtained from experimentation. The sampled antigen(s) 98 are correlated in the correlation block 100. In block 102, the lifespan of the DC instance is decremented by the value of the output signal value $O_1$. Block 104 checks to see if the DC has exceeded its predefined lifespan. One technique that may be used by block 104 to determine if the lifespan has been exceeded is by checking if the previously initialized lifespan (which is continually being decremented at block 102) have decremented to a value of 0 or below. If the lifespan is currently below or equal to 0, the lifespan is said to have been exceeded. If block 102 identifies that the DC has exceeded its lifespan, the DC is migrated in the DC migration block 120. Else, the DC returns to block 94 where it continues to sample the antigens and signals. In the migration block 120, a context value is assigned to the DC. This context value may be assigned based on the value of the output signal $O_2$. If the value of $O_2$ is greater than 0, then the DC is assigned a context value of 1, meaning that it's collected antigens may be anomalous. Else, if the value of $O_2$ is less than 0, the DC is assigned a context of 0 indicating that it's collected antigen is likely to be normal.

Figure 3B:
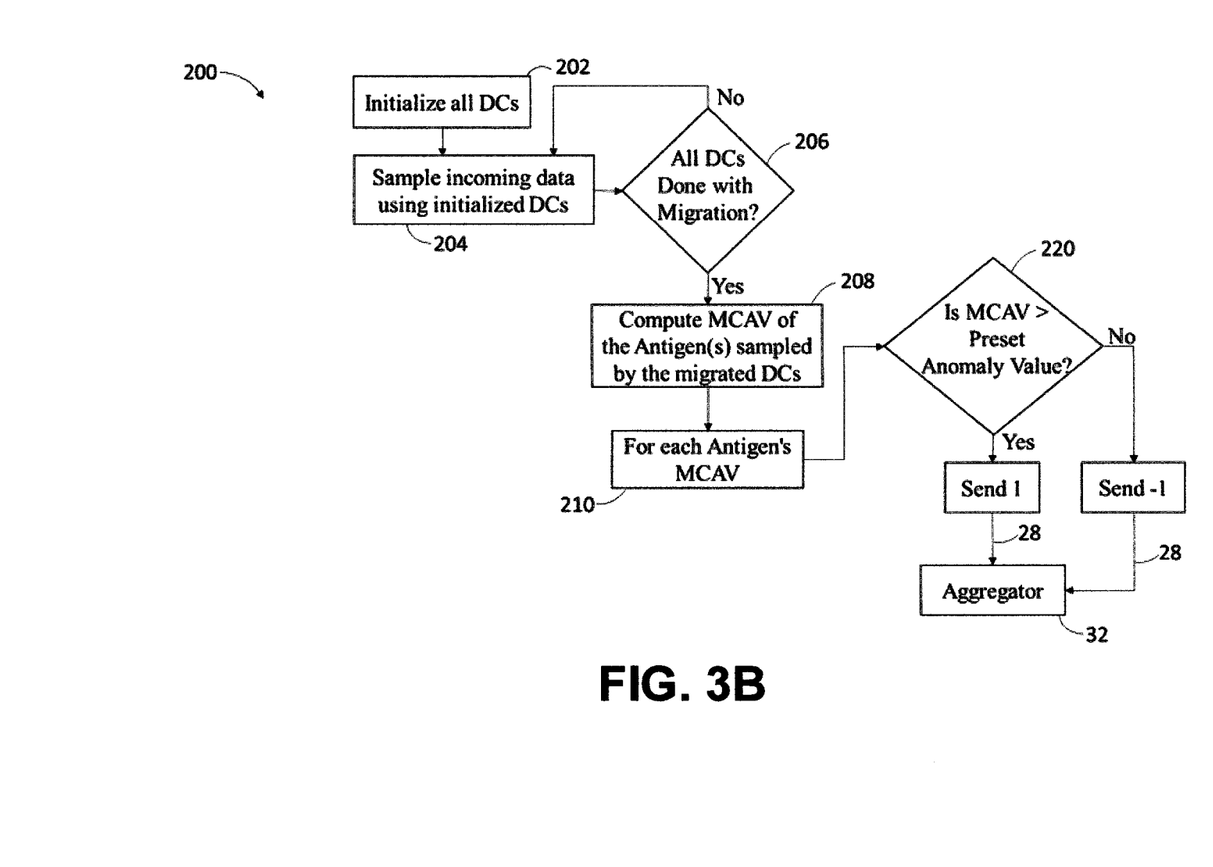
FIG. 3b is a flow chart illustrating one example of an individual dendritic cell algorithm in a DCA module.

FIG. 3b is a flow chart illustrating one example of an individual dendritic cell algorithm DCA-n 24 in a DCA module 20. In this example, all the DCs that constitutes DCA-n 24 are first initialized in block 202. In block 204, all the initialized DCs sample the antigen and its associated signals that are coming from the data extraction block 17. Block 206 is responsible for evaluating the migration status of all the participating DCs. Once all the DCs are done with sampling incoming data and have all migrated, block 208 computes the mature antigen context value (MCAV) of all antigen that was sampled in block 204. The MCAV is used to access the degree of anomaly of a given antigen. That is, antigens with MCAV greater than an assigned threshold is tagged as an anomaly, while those with MCAV below this threshold is tagged normal. If an antigen is found to be anomalous, a signal 28 with a value of +1 is sent to the aggregator block 32, and if it is found to be normal/benign, a signal 28 with a value of −1 or 0 is sent to the aggregator block 32.

Figure 4:
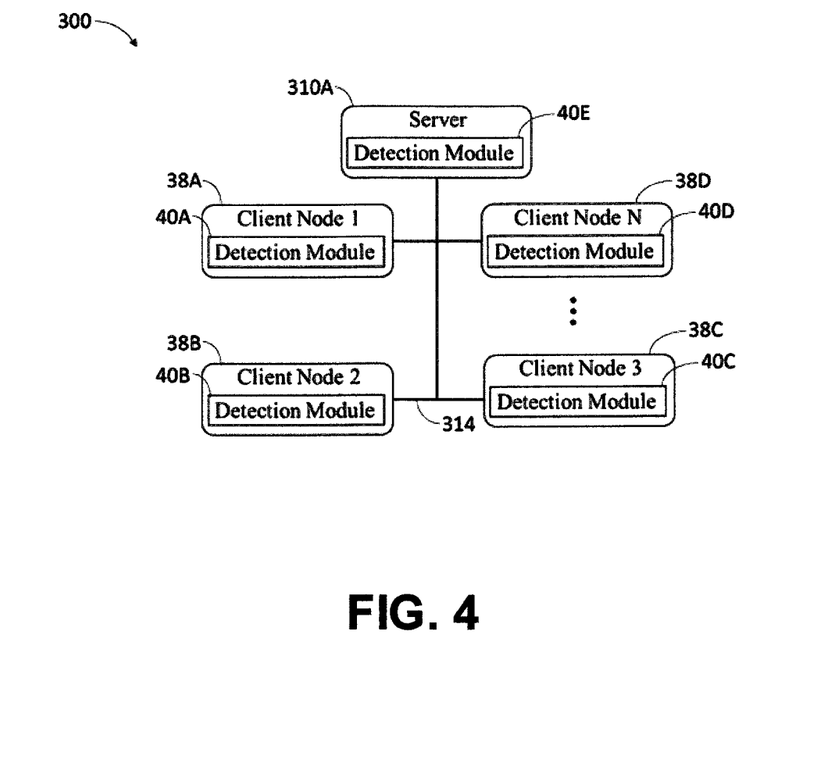
FIG. 4 is a block diagram of an exemplary network having a server and a plurality of computing nodes including detection modules.

FIG. 4 is a block diagram of an exemplary network having a server 310A and a plurality of client nodes. All nodes (both server 310A and each client node 38A-D) in this exemplary network include the detection module 40. In this exemplary network, the server 310A is configured to be a centralized server. The server 310A may comprise a cloud server (i.e., a logical server that is built, hosted and delivered through a cloud computing platform over the Internet). The interconnection 314 between the client devices may be any form of wireless or wired communication medium. Also, in this exemplary network 300, any client node 38 may be in communication with any other client node 38 or multiple other client nodes 38. Those of ordinary skill in the art will understand that how the client nodes 38 are interconnected in this exemplary centralized network 300 may vary widely from the example shown in FIG. 4. An example of an application that utilizes the network architecture of FIG. 4 includes but not limited to: a smart grid network—where the client node 38 may be a power meter, an outstation device, etc.; or a mobile Ad-hoc network—where the client node 38 may be a mobile device (cell phone, tablet, etc.), an autonomous device (robots, drones, connected driverless vehicles, etc.). The detection module 40 included in client nodes 38A-D independently protect each client node 38 from cyber attacks or intrusion that may come from an external or internal source. But if each detection module 40A-D cannot classify an incoming data as malicious or normal with high confidence, it reaches out to the detection module 40E which is running on server node 310A for assistance.

Figure 5:
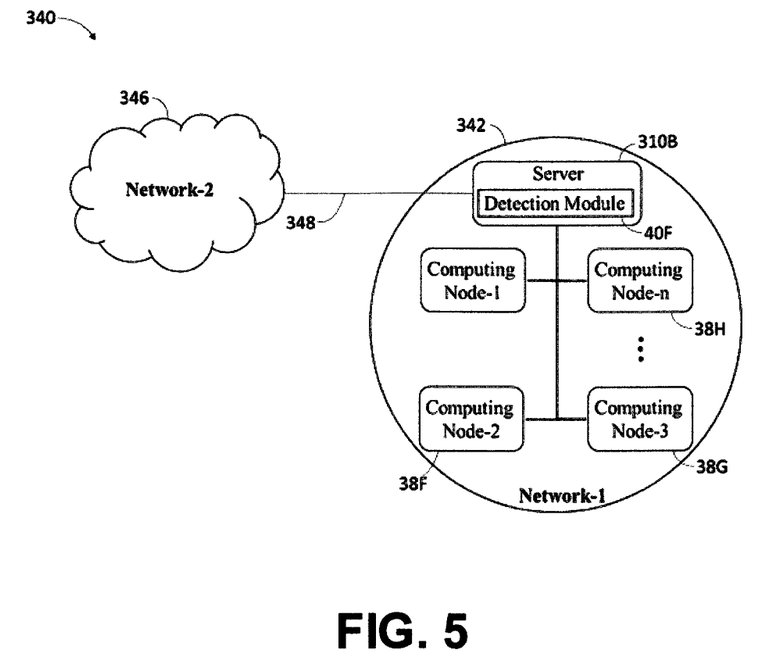
FIG. 5 is a block diagram of an exemplary network that shows how the detection module may be included in a server positioned at the entrance of a network having a plurality of computing nodes.

FIG. 5 is a block diagram of an exemplary network 340 that shows how the detection module 40 may be included in a server 310B positioned at the entrance of a network having a plurality of computing nodes 38E-H (none of which includes a detection module 40. FIG. 5 constitutes of two subnetworks: network-1 342 and network-2 346. Network-1 342 consists of computing nodes 38E-H in which any computing node 38 may be in communication with any other computing node 38 or multiple other computing nodes 38. An example of network-2 346 may be the Internet. This communication between computing nodes 38 may include communication between computing nodes 38 residing on the same network (e.g., computing nodes 38E-H residing in network-1 342), or communication between a computing node 38 residing in network-1 342 with another computing node 38 (or multiple other computing nodes 38) residing in network-2 346. The communication medium 348 may be a wired or wireless communication medium, and, network-1 342 and network-2 346 may be in the same geo-location or separated by a lot of geographical distance. Network-1 342 and network-2 346 may also be virtual networks. In the exemplary network 340, the detector module 40F is responsible for detecting a cyber attack or intrusion coming in from network-2 346 to network-1 342, or intrusions that originate in network-1 342 targeting computing nodes 38 residing in network-1 342 (e.g., computing node-3 38G).

Figure 6:
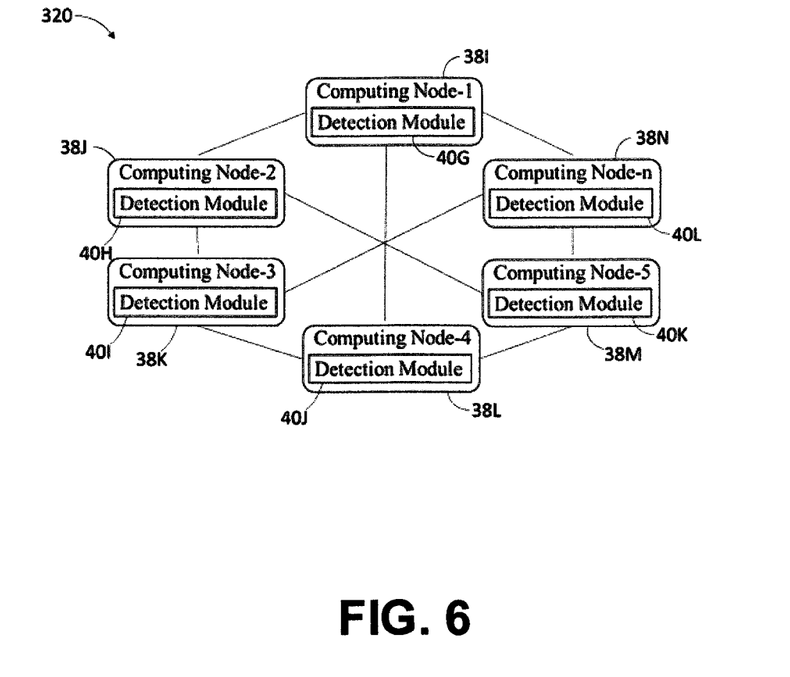
FIG. 6 is a block diagram of an exemplary distributed network with a plurality of computing nodes all including detection modules.

FIG. 6 is a block diagram of an exemplary distributed network 320 with a plurality of computing nodes 38I-N all including detection modules 40. In this distributed network 320, any computing node 38 may be in communication with any other computing node 38 or multiple other computing nodes 38. The detector modules 40G-L may be configured to operate in a fully autonomous manner in the sense that each detection module 40 (e.g., detection module 40I), running on a computing node 38 (e.g., computing node-3 38K), protects the computing node 38 from a cyber attack/intrusion without requiring assistance from other detection modules 40 (e.g., assistance from a detection module 40L), running on another computing node (e.g., computing node-3 38N). The detector modules 40G-L may also be configured to operate in a semi-autonomous manner in the sense that each detection module 40 (e.g., detection module 40I), running on a computing node 38 (e.g., computing node-3 38K), protects the computing node 38 from a cyber-attack/intrusion in an autonomous manner, but may request assistance from other detection modules 40 (e.g., assistance from a detection module 40L), running on another computing node (e.g., computing node-3 38N) when it requires a higher confidence value before classifying a seen activity as either an attack or normal/benign.

Figure 7:
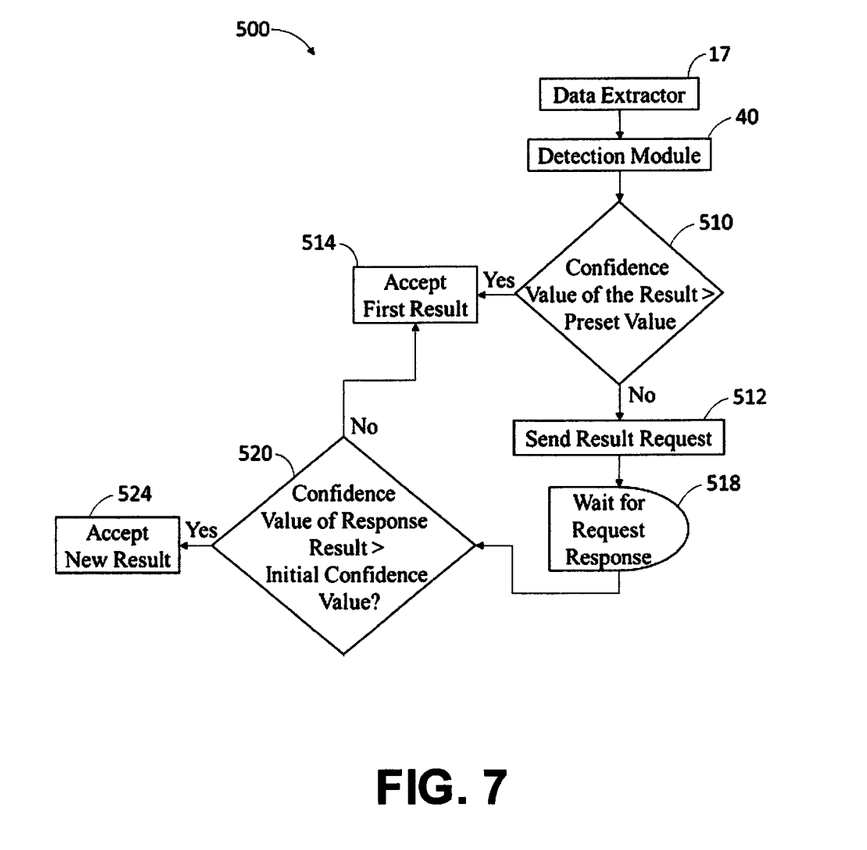
FIG. 7 is a flow chart that depicts a method used by each computing node of FIG. 4 and FIG. 6 to query a server of FIG. 4 or a neighboring computing node of FIG. 6.

FIG. 7 is a flow chart that depicts a method 500 that may be used by each computing node 38 of FIG. 4 and FIG. 6 to query a server 310A of FIG. 4 or another computing node 38 of FIG. 6 for assistance in classifying a seen activity or incoming traffic as an attack or normal/benign. In FIG. 7, the detection module 40 included in the computing node 38 classifies the antigen coming from the data extractor 17 as either an attack or normal/benign. The confidence value which is also included in the result from the detector module 40 is evaluated by block 510. If this confidence value is greater than a preset threshold, the computing node 38 running this method will accept this first result 514. If the confidence value is lower than the preset threshold, at block 512, a result request/query is sent to a neighboring node (e.g., another computing node 38 in the case of FIG. 6 or a server 310 in the case of FIG. 4) which also includes a detection module 40. In block 518, the computing node 38 running this method 500 waits for a result response from its neighboring node. While waiting for a response, the computing node 38 using this method 500 may continue to evaluate another incoming antigen sample. In block 520, the computing node 38 evaluates the confidence value in the result sent by the responding neighboring node. If this second confidence value is greater than the initial confidence value that triggered the request, the new result is accepted in block 524, else, the computing node 38 accepts the first result 514.

Figure 8:
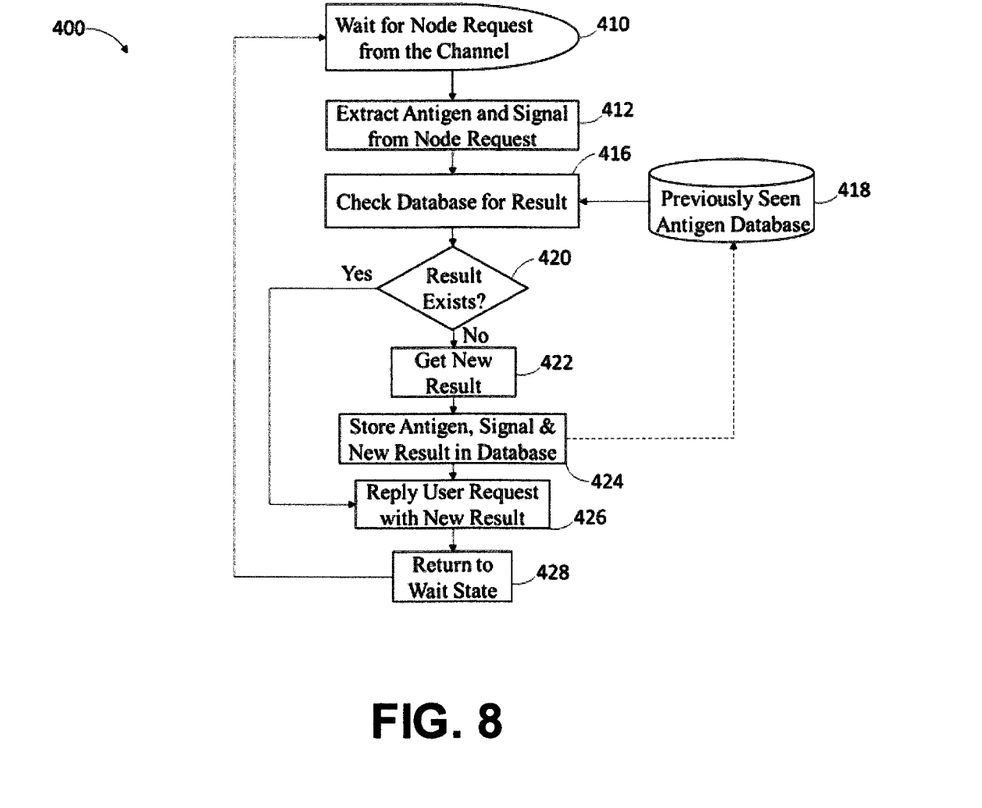
FIG. 8 is a flow chart that depicts a method used by each computing node of FIG. 4 and FIG. 6, and server of FIG. 4, to respond to a result request from other computing nodes.

FIG. 8 is a flow chart that depicts a method 400 used by each computing node 38 FIG. 6, and server 310A of FIG. 4, to respond to a result request/query from other computing nodes 38. A computing node 38 running this method 400 (either as a standalone process or as part of another process), waits for a request from a neighboring node at block 410. When a request/query is received in block 410, the computing node 38, in block 412, extracts the antigen and the signal embedded in the node request/query. In block 416, the computing node 38 checks the previously seen antigen database 418 to ascertain if has seen/processed the antigen and signal contained in the query. If block 416 confirms that this antigen exists in the previously seen antigen database 418, the decision block 420 will pass the seen result to block 426. In block 426, the computing node 38 replies the requesting node with the new result, and in block 428, the computing node 38 returns to the wait state 410. If block 416 confirms that the antigen does not exist, the antigen signal is sent to block 422 where a new result for this antigen is obtained. The new result is stored in block 424, and in block 426, this new result is sent to the requesting computing node 38.

Although this disclosure has been described in terms of certain preferred embodiments, other embodiments that are apparent to those of ordinary skill in the art, including embodiments that do not provide all the features and advantages set forth herein, are also within the scope of this disclosure. Accordingly, the scope of the present disclosure is defined only by reference to the appended claims and equivalents thereof.

What is claimed is:

1. A system for detecting insider or outsider attacks/intrusions, comprising:
   a local node;
   one or more computing nodes connected to the local node; and
   a detection module in the local node that is operative to perform actions, including:
      using a plurality of sensors to measure data indicative of the state of the environment of the sensor;
      using a data fusion module to combine all different data obtained from the various sensors to form a single chunk of data;
      passing the combined data to a data pre-processing module for processing, wherein the data pre-processing module extracts an input signal vector from the combined data chunk;
      using a dendritic cell algorithm module (DCA) to analyze the input signal vector to produce a first signal, wherein the DCA module comprise a plurality of dendritic cell algorithms running in parallel with each other;
      using a negative selection algorithm (NSA) module to analyze the input signal vector to produce a second signal, wherein the NSA module comprises a plurality of negative selection algorithms (NSAs) running in parallel with each other under the same process, or different individual processes;
      using an aggregator module to combine the first signal and the second signal generated by the NSA and DCA module respectively to produce an anomaly signal value; and
      using a decision module to decide if an unauthorized activity/traffic is detected using the anomaly signal value.

2. The system of claim 1, wherein the local node and the connected computing node(s) comprise: (a) a collection of discrete computing devices, (b) a collection of logical nodes within a single computing device, or (c) a combination of discrete computing devices and logical nodes.

3. The system of claim 1, wherein the system comprises a distributed network.

4. The system of claim 1, wherein the system comprises a centralized server and a plurality of computing nodes.

5. The system of claim 1, wherein the sensor data comprises computing node's network traffic information, computing node user activities, location data of a user/employee, or a user/employee behavioral data.

6. The system of claim 1, wherein the data fusion module combines all the data from the sensors based on their time of arrival.

7. The system of claim 1, wherein the data pre-processing module comprises of:
   scaling all the individual data value coming from the data fusion module to fall within the range of 0 and 1; and
   forming an input vector consisting of an antigen and three signals: the pathogenic associated molecular patterns (PAMP) signal, the danger signal (DS) and the safe signal (SS).

8. The system of claim 7, wherein the PAMP, DS and SS has either an integer or floating point value.

9. The system of claim 1, wherein the DCA module comprises a plurality of dendritic cell algorithms (DCAs) running in parallel with each other under the same process, or different individual processes.

10. The system of claim 1, wherein the NSA module and the DCA module are executed in parallel with each other under the same process or different individual processes.

11. The system of claim 1, wherein the aggregator module computes the average of the input signals it receives from both the NSA module and the DCA module.

12. The system of claim 11, wherein the average is a weighted average.

13. The system of claim 1, wherein the aggregator sums the input signals it receives from both the NSA module and the DCA module.

14. A system for detecting insider or outsider attacks/intrusions, comprising:
   a local node;
   one or more computing nodes connected to the local node; and
   a detection module in the local node that is operative to perform actions, including:
      using a plurality of sensors to measure data indicative of the state of the environment of the sensor;
      using a data fusion module to combine all different data obtained from the various sensors to form a single chunk of data;
      passing the combined data to a data pre-processing module for processing, wherein the data pre-processing module extracts an input signal vector from the combined data chunk;
      using a dendritic cell algorithm module (DCA) to analyze the input signal vector to produce a single signal;
      using a negative selection algorithm (NSA) module to analyze the input signal vector to produce a single signal;
      using an aggregator module to combine the single signals generated by the NSA and DCA module respectively to produce an anomaly signal value; and
      using a decision module to decide if an unauthorized activity/traffic is detected using the anomaly signal value; wherein the NSA module comprises a plurality of negative selection algorithms (NSAs) running in parallel with each other under the same process, or different individual processes; and wherein each NSA comprises:
   a training phase that is operative to perform actions including:
      extracting normal profiles from an input vector for a duration of time;
      generating random detectors that do not match the normal profiles;
      moving randomly generated detectors which though they did not match the normal profiles, overlapped with previously generated detector(s);
      storing the final generated detectors in the detector generation database; and
   a testing phase that is operative to perform actions including:
      comparing new input vectors (that are presented by the data extraction block after the completion of the training phase) with the stored, randomly generated detectors;
      sending a signal value of +1 to the aggregator module if an input vector under test matches any stored detector; and
      sending a signal value of −1 or 0 to the aggregator module if an input vector under test does not match any stored detector.

15. The system of claim 14, wherein the generated detectors have the same dimension as the input vector.

16. A system for detecting insider or outsider attacks/intrusions, comprising:
a local node;
one or more computing nodes connected to the local node; and
a detection module in the local node that is operative to perform actions, including:
using a plurality of sensors to measure data indicative of the state of the environment of the sensor;
using a data fusion module to combine all different data obtained from the various sensors to form a single chunk of data;
passing the combined data to a data pre-processing module for processing, wherein the data pre-processing module extracts an input signal vector from the combined data chunk;
using a dendritic cell algorithm module (DCA) to analyze the input signal vector to produce a single signal;
using a negative selection algorithm (NSA) module to analyze the input signal vector to produce a single signal;
using an aggregator module to combine the single signals generated by the NSA and DCA module respectively to produce an anomaly signal value; and
using a decision module to decide if an unauthorized activity/traffic is detected using the anomaly signal value; wherein the NSA module comprises a plurality of negative selection algorithms (NSAs) running in parallel with each other under the same process, or different individual processes; wherein each DCA is operative to perform actions including:
creating and initializing dendritic cell (DC) instances;
sampling the input vector data using initialized DCs;
migrating DCs that have exceeded their lifespan;
computing the mature antigen context value (MCAV) of all antigen that was sampled from the input vector;
comparing the MCAV value of all the sampled antigens with a preset anomaly value;
sending a signal value of +1 to the aggregator module if the MCAV value of the antigen under test exceeds the preset anomaly value; and
sending a signal value of −1 or 0 to the aggregator module if the MCAV value of the antigen under test is below the preset anomaly value.

17. The system of claim 16, wherein sampling the input data vector using an individual DC includes:
sampling an antigen using an antigen sampler;
sampling signals that are associated with the antigen sampled by the antigen sampler;
using a signal-to-output transformer to transform the three signals (PAMP, DS, and SS) that are part of the input vector into two output signals ($O_1$ and $O_2$);
using a correlation block to correlate the sampled antigens and the output signals; and
using output signal ($O_1$) to decrement the initialized lifespan of the DC.

18. The system of claim 16, wherein migrating DCs that have exceeded their lifespan comprises:
comparing the lifespan of each DC instance at the time of migration with zero; and
re-initializing any the DC whose lifespan at the time of migration has become less than zero.

19. The system of claim 18, wherein re-initializing DCs comprises: assigning a context value of 0 to any DC if the value of its output $O_2$ is greater than 0, and assigning a context value of 1 to any DC if the value of its output $O_2$ is less than 0.

20. The system of claim 16, wherein the anomaly value is an integer or floating point value.

* * * * *